US008924432B2

(12) United States Patent
Richards et al.

(10) Patent No.: US 8,924,432 B2
(45) Date of Patent: Dec. 30, 2014

(54) PORTABLE HAND HELD CONTROLLER FOR AMUSEMENT DEVICE

(71) Applicant: AMI Entertainment Network, Inc., Bristol, PA (US)

(72) Inventors: Ronald Richards, Elmhurst, IL (US); Danny Garrett, Batavia, IL (US); Charles Jaros, Chicago, IL (US)

(73) Assignee: AMI Entertainment Network, LLC, Wilmington, DE (US)

( * ) Notice: Subject to any disclaimer, the term of this patent is extended or adjusted under 35 U.S.C. 154(b) by 161 days.

(21) Appl. No.: 13/627,408

(22) Filed: Sep. 26, 2012

(65) Prior Publication Data

US 2013/0080483 A1    Mar. 28, 2013

Related U.S. Application Data

(60) Provisional application No. 61/539,423, filed on Sep. 26, 2011.

(51) Int. Cl.
*G06F 17/30*    (2006.01)

(52) U.S. Cl.
CPC .................................. *G06F 17/3087* (2013.01)
USPC ............. 707/803; 707/E17.005; 707/E17.032

(58) Field of Classification Search
CPC .......... G06F 17/30244; G06F 17/3028; G06F 17/30749; G06F 17/30761; G06F 17/30772; G06F 17/3087
See application file for complete search history.

(56) References Cited

U.S. PATENT DOCUMENTS

| | | |
|---|---|---|
| 4,072,930 A | 2/1978 | Lucero et al. |
| 4,467,424 A | 8/1984 | Hedges et al. |
| 4,494,197 A | 1/1985 | Troy et al. |
| 4,592,546 A | 6/1986 | Fascenda et al. |
| 4,593,904 A | 6/1986 | Graves |
| 4,652,998 A | 3/1987 | Koza et al. |
| 4,856,787 A | 8/1989 | Itkis |
| 4,858,930 A | 8/1989 | Sato |
| 5,083,271 A | 1/1992 | Thacher et al. |
| 5,114,155 A | 5/1992 | Tillery et al. |
| 5,429,361 A | 7/1995 | Raven et al. |
| 5,558,339 A | 9/1996 | Perlman |
| 5,702,305 A | 12/1997 | Norman et al. |

(Continued)

FOREIGN PATENT DOCUMENTS

JP    2011016022 A    1/2011

OTHER PUBLICATIONS

Rashid et al., "Extending Cyberpsace: Location Based Games Using Cellular Phones"; published Jan. 2006 (18 pages).

(Continued)

*Primary Examiner* — Anteneh Girma
(74) *Attorney, Agent, or Firm* — Panitch Schwarze Belisario & Nadel LLP

(57) ABSTRACT

A method of improving accuracy of a database of amusement device locations is described. A plurality of amusement devices are deployed at a plurality of locations. The database of amusement device locations is populated based on the deploying. A server receives over a network, from a portable device, a check-in request. The check-in request is associated with one of the amusement devices, and includes geographic location information associated with the portable device at the time the check-in request is made. The server compares the geographic location information received from the portable device with the location of the amusement device stored in the database, and updates the database based on the comparing.

19 Claims, 12 Drawing Sheets

(56) References Cited

U.S. PATENT DOCUMENTS

| | | |
|---|---|---|
| 5,779,549 A | 7/1998 | Walker et al. |
| 5,797,795 A | 8/1998 | Takemoto et al. |
| 5,855,483 A | 1/1999 | Collins et al. |
| 5,881,366 A | 3/1999 | Bodenmann et al. |
| 5,971,397 A | 10/1999 | Miguel et al. |
| 5,999,808 A | 12/1999 | LaDue |
| 6,077,162 A | 6/2000 | Weiss |
| 6,224,486 B1 | 5/2001 | Walker et al. |
| 6,287,202 B1 | 9/2001 | Pascal et al. |
| 6,524,189 B1 | 2/2003 | Rautila |
| 6,755,744 B1 | 6/2004 | Nathan et al. |
| 6,908,390 B2 | 6/2005 | Nguyen et al. |
| 7,305,260 B2 | 12/2007 | Vuori et al. |
| 7,438,643 B2 | 10/2008 | Brosnan et al. |
| 7,460,863 B2 | 12/2008 | Steelberg et al. |
| 7,510,474 B2 | 3/2009 | Carter, Sr. |
| 7,637,810 B2 | 12/2009 | Amaitis et al. |
| 7,644,861 B2 | 1/2010 | Alderucci et al. |
| 7,689,302 B2 | 3/2010 | Schlottmann et al. |
| 7,699,703 B2 | 4/2010 | Muir et al. |
| 7,778,792 B2 | 8/2010 | Huang et al. |
| 7,780,522 B2 | 8/2010 | Lutnick et al. |
| 7,828,654 B2 | 11/2010 | Carter, Sr. |
| 7,901,294 B2 | 3/2011 | Walker et al. |
| 7,907,119 B2 | 3/2011 | Lin |
| 8,043,156 B2 | 10/2011 | Ackley et al. |
| 2001/0044339 A1 | 11/2001 | Cordero et al. |
| 2002/0019984 A1 | 2/2002 | Rakib |
| 2002/0023010 A1 | 2/2002 | Rittmaster et al. |
| 2002/0071557 A1 | 6/2002 | Nguyen |
| 2002/0151327 A1 | 10/2002 | Levitt |
| 2003/0046557 A1 | 3/2003 | Miller et al. |
| 2003/0064805 A1 | 4/2003 | Wells |
| 2003/0104865 A1 | 6/2003 | Itkis et al. |
| 2003/0176213 A1 | 9/2003 | LeMay et al. |
| 2004/0002375 A1 | 1/2004 | Ogawa |
| 2004/0132530 A1 | 7/2004 | Rutanen et al. |
| 2004/0266523 A1 | 12/2004 | Gentles et al. |
| 2005/0014554 A1 | 1/2005 | Walker et al. |
| 2005/0148392 A1 | 7/2005 | Martinez et al. |
| 2005/0181870 A1 | 8/2005 | Nguyen et al. |
| 2005/0193209 A1 | 9/2005 | Saunders et al. |
| 2006/0035707 A1 | 2/2006 | Nguyen et al. |
| 2006/0089200 A1 | 4/2006 | Twerdahl |
| 2006/0205511 A1 | 9/2006 | Thomas et al. |
| 2006/0223627 A1 | 10/2006 | Nozaki et al. |
| 2006/0239131 A1 | 10/2006 | Nathan et al. |
| 2007/0279394 A1 | 12/2007 | Lampell et al. |
| 2007/0281285 A1 | 12/2007 | Jayaweera |
| 2008/0076572 A1 | 3/2008 | Nguyen et al. |
| 2008/0085753 A1 | 4/2008 | Okada |
| 2008/0096628 A1 | 4/2008 | Czyzewski et al. |
| 2008/0168807 A1 | 7/2008 | Dion et al. |
| 2008/0171594 A1 | 7/2008 | Fedesna et al. |
| 2008/0200257 A1 | 8/2008 | Stelzer |
| 2008/0214286 A1 | 9/2008 | Lutnick et al. |
| 2008/0242405 A1 | 10/2008 | Chen et al. |
| 2009/0036203 A1 | 2/2009 | Anderson et al. |
| 2009/0085877 A1 | 4/2009 | Chang et al. |
| 2009/0093306 A1 | 4/2009 | Muir et al. |
| 2009/0197684 A1 | 8/2009 | Arezina et al. |
| 2009/0298593 A1 | 12/2009 | Kobayashi et al. |
| 2010/0105454 A1 | 4/2010 | Weber et al. |
| 2010/0113162 A1 | 5/2010 | Vemuri et al. |
| 2010/0234104 A1 | 9/2010 | Ruppert et al. |
| 2010/0304860 A1 | 12/2010 | Gault et al. |
| 2012/0276851 A1 | 11/2012 | Layne, IV et al. |

OTHER PUBLICATIONS

Touchtunes Playportt, Amusement and Music Operators Association (AMOA) International Expo & Fun Expo, Sep. 27-29, 2007.

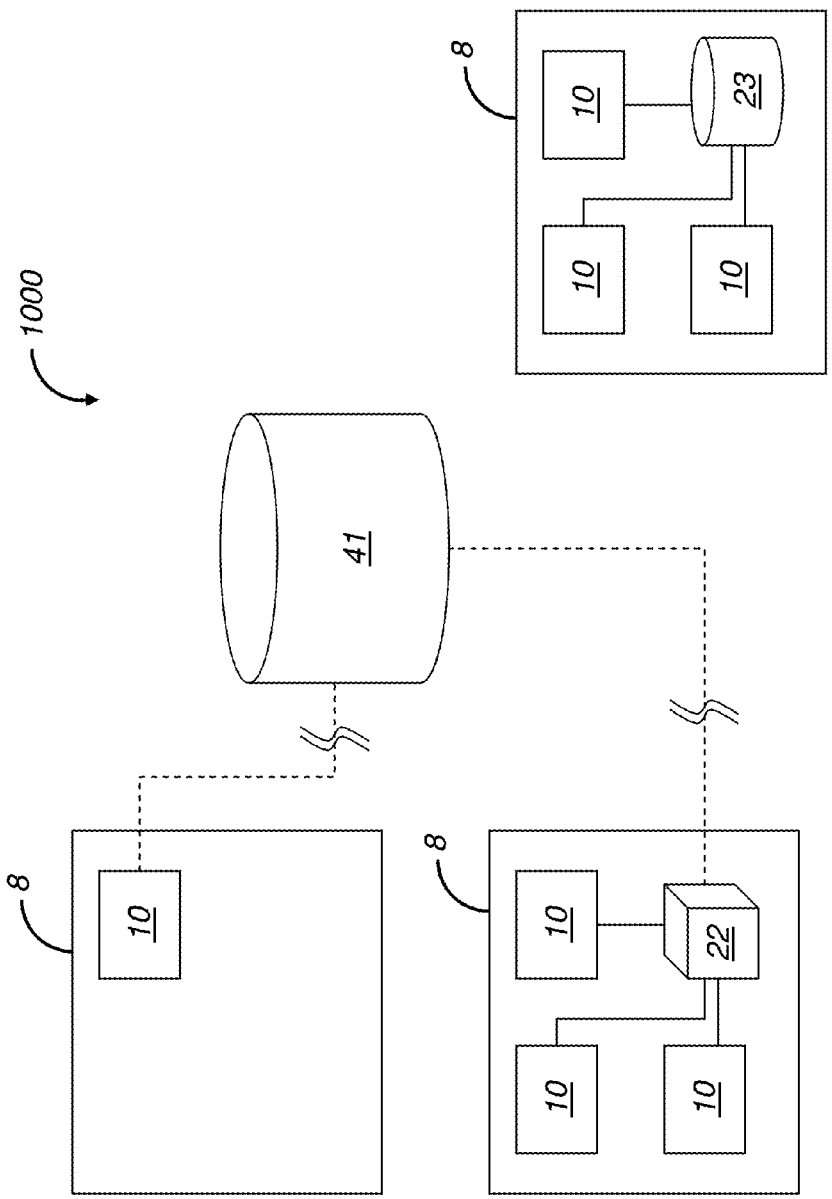

PORTABLE HAND HELD CONTROLLER FOR AMUSEMENT DEVICE

CROSS-REFERENCE TO RELATED APPLICATIONS

This application claims the benefit of U.S. Provisional Patent Application No. 61/539,423, filed on Sep. 26, 2011, entitled "Portable Hand Held Controller for Amusement Device," the entire contents of which are incorporated herein by reference in its entirety.

BACKGROUND OF THE INVENTION

Embodiments of the present invention relate generally to electronic amusement devices and systems. More particularly, embodiments of the present invention are directed to a system for remotely interacting with an amusement device using a portable device and using the interactivity data to improve the accuracy of amusement device location information.

Amusement devices having electronic games for computers and touchscreens or other types of amusement devices are generally well known in the art. Amusement devices, such as game machines, which allow a user to select games from a video display are well known in the art, such as those disclosed in U.S. Pat. No. 4,856,787 ("Itkis"), U.S. Pat. No. 5,575,717 ("Houriet, Jr., et al."), and U.S. Pat. No. 5,743,799 ("Houriet, Jr., et al."), whose disclosure is incorporated by reference herein in their entirety, and show a touchscreen for making a game selection from a menu of games. Such game machines or amusement devices typically operate upon input of currency (e.g., coin, token, paper money, credit/debit cards or the like) and are installed in venues such as bars, restaurants, airports, shopping malls, video arcades, casinos, or the like. Each amusement device usually includes a plurality of content choices, including electronic games, animations, videos and audio files. The game choices may include card games, sports games, games of skill, games of chance, action games, trivia games, or the like.

Often, it is preferable to allow players to interact with an amusement device deployed at a venue remotely. For example, where a patron would like to request a song to be played by the amusement device, it is preferable to allow the user to request the song without occupying the machine so that it remains available to be used by other venue patrons. Portable devices having wireless communications interfaces, such as smart phones, may be used for this type of remote interaction. However, in order for the user to interact with a specific amusement device remotely, the amusement device must be located so that commands may be sent between the portable device and, indirectly, the desired amusement device. Previously, the only available information about amusement device locations was compiled when the amusement devices were deployed or serviced. This resulted in the location information being out of date and often inaccurate.

It is therefore desirable to allow users to interact with proximately located amusement devices. It is further desirable to improve the accuracy of amusement device location information based on interactivity data.

BRIEF SUMMARY OF THE INVENTION

A method of improving accuracy of a database of amusement device locations is described. A plurality of amusement devices are deployed at a plurality of locations. The database of amusement device locations is populated based on the deploying. A server receives over a network, from a portable device, a check-in request. The check-in request is associated with one of the amusement devices, and includes geographic location information associated with the portable device at the time the check-in request is made. The server compares the geographic location information received from the portable device with the location of the amusement device stored in the database, and updates the database based on the comparing.

In another embodiment, a method of improving accuracy of a database of amusement device locations is described. A plurality of amusement devices are deployed at a plurality of locations. Each of the plurality of amusement devices is associated with a unique identifier that is accessible to venue patrons. The database of amusement device locations is populated with the plurality of locations at which the plurality of amusement devices have been deployed. A server receives over a network, interaction data from a portable device associated with one of the venue patrons. The received interaction data includes indicia of an interaction with a unique identifier associated with an amusement device, and geographic location information associated with the portable device at the time of the interaction. The server updates the database of amusement device locations based on the indicia of interaction and the received geographic location information.

In yet another embodiment, a method of updating a database of amusement device locations is described. The method includes deploying a plurality of amusement devices at a plurality of distinct venues and populating the database of amusement device locations with the plurality of venues at which the plurality of amusement devices have been deployed. A server receives over a network indicia of an interaction with a first amusement device from a portable device. The server determines that the first amusement device is not associated with the correct venue name in the database of amusement device locations and transmits a request to the portable device to enter a venue name of the venue at which the first amusement device is deployed. The server updates the database of amusement device locations with the provided venue name.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 8A is a schematic block diagram of various configurations of an amusement device system in accordance with certain preferred embodiments of the present invention; and FIG. 8B is a schematic block diagram of a gaming location having a local server in accordance with a preferred embodiment of the present invention.

DETAILED DESCRIPTION OF THE INVENTION

Figure 1A:
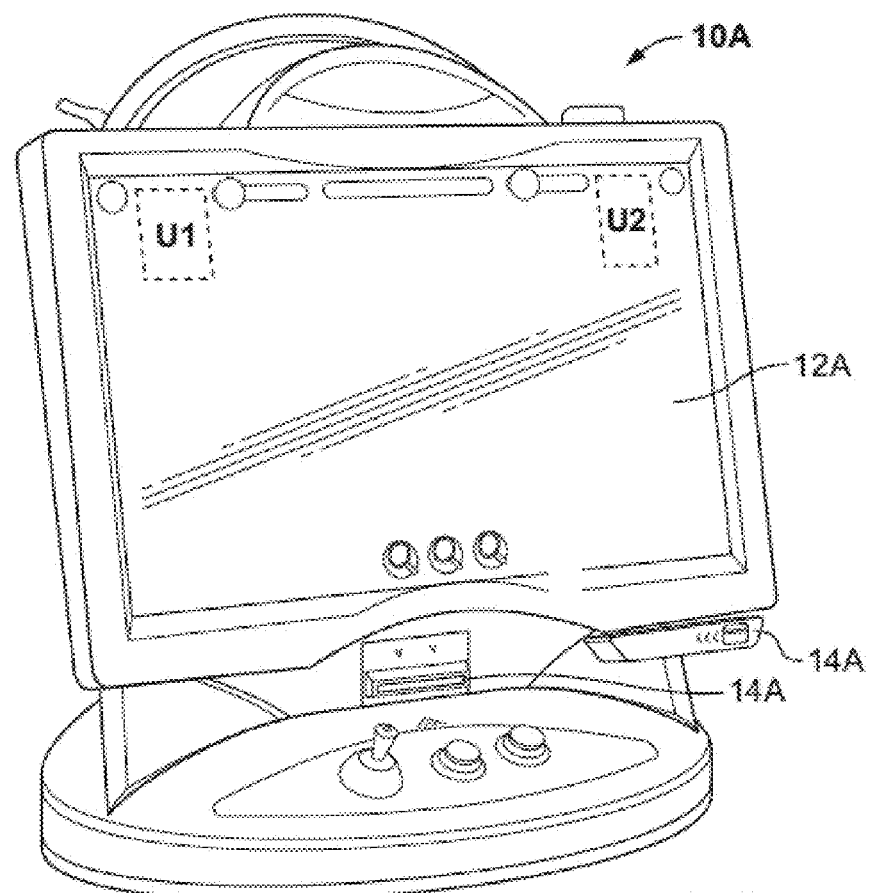
FIG. 1A is a perspective view of an amusement device in accordance with a first preferred embodiment of the present invention.

Certain terminology is used in the following description for convenience only and is not limiting. The words "right", "left", "lower", and "upper" designate directions in the drawings to which reference is made. The terminology includes the above-listed words, derivatives thereof, and words of similar import. Additionally, the words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Referring to the drawings in detail, wherein like reference numerals indicate like elements throughout, there is shown in FIG. 1A a first preferred embodiment of an amusement device 10A. The amusement device 10A includes a controller U1 and a memory U2. The memory U2 can be any known or suitable memory device such as random access memory (RAM), read only memory (ROM), flash RAM, hard disk, optical disk, or the like. The amusement device 10A further includes a video display 12A that is operatively connected to the controller U1. The amusement device 10A is preferably a counter-top or table-top apparatus, but may be arranged in any configuration, such as free-standing, floor-standing, table mount, wall mount, pole mount, and the like without departing from the invention.

The amusement device 10A also includes at least one input component 14A that receives value in order to establish one or more playable credits. The value received may be at least one of currency, coins, tokens, chits, credits, credit cards/debit cards or the like. Although two input components 14A are shown, the amusement device 10A may include any number of input components 14A to give a user options for payment, for permitting multiple players, or the like. Preferably, the amusement device 10A is made operable upon actuation of the input component 14A, for example, the user may only select and play an electronic game once value is received at the input component 14A and/or one or more playable credits are issued to the user. However, free selections may be offered at the discretion of an operator of the amusement device 10A.

Figure 1B:
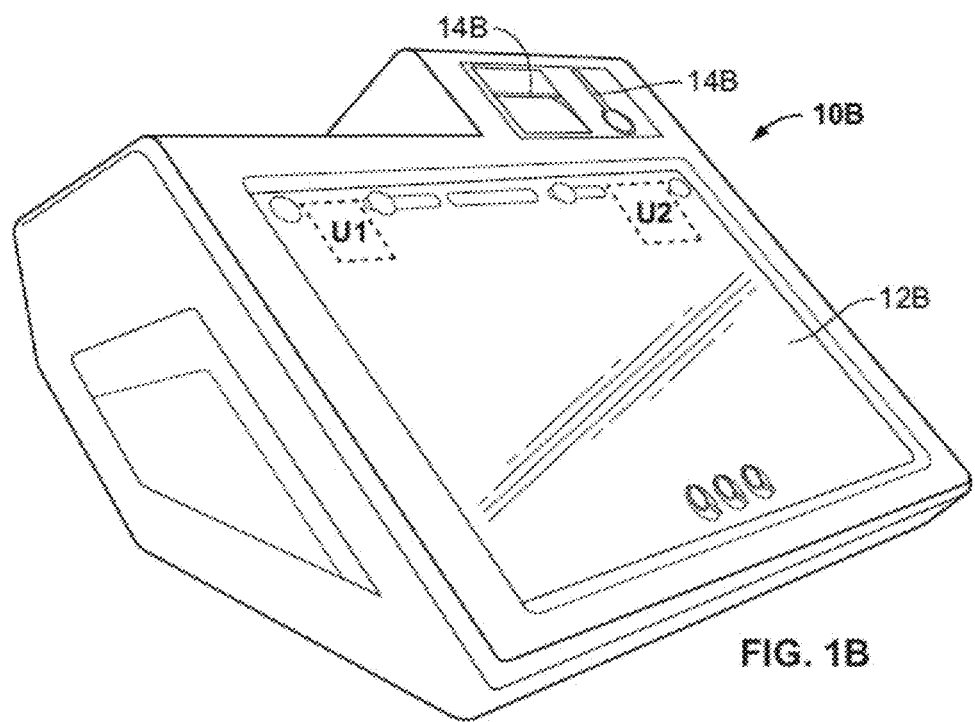
FIG. 1B is a perspective view of an amusement device in accordance with a second preferred embodiment of the present invention.

FIG. 1B shows another or second amusement device 10B in accordance with a second preferred embodiment of the present invention. The second amusement device 10B also includes a controller U1, a memory U2, a video display 12B, and at least one input component 14B. Preferably, the video displays 12A, 12B are touchscreen video displays configured to accept touch input.

Figure 1C:
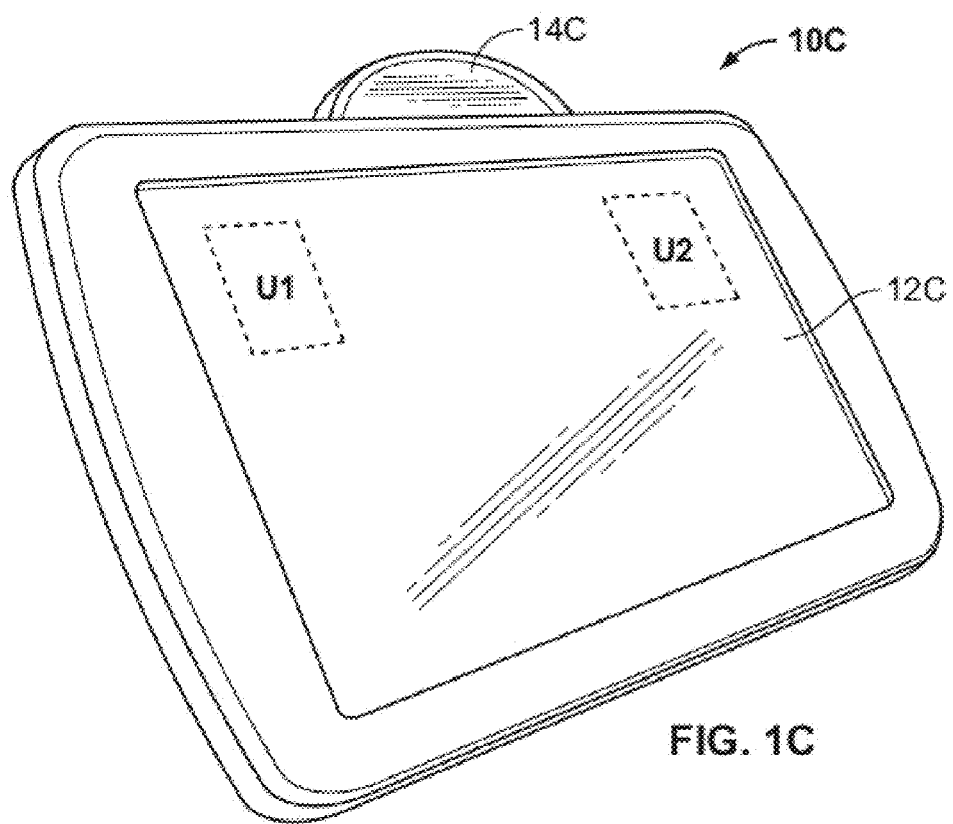
FIG. 1C is a perspective view of an amusement device in accordance with a third preferred embodiment of the present invention.

FIG. 1C shows yet another or third portable amusement device 10C in accordance with a third preferred embodiment of the present invention. The third amusement device 10C is a portable device, preferably battery-powered, and includes a controller U1, memory U2, a display 12C, and at least one input component 14C. The third amusement device 10C is preferably usable with a docking station (not shown). The docking station preferably secures the device 10C until access is required by an operator or is paid for by a user. Release from the docking station may occur via an entry through the input component 14C, which is preferably a card reader. The docking station may also provide battery recharging and other services to the amusement device 10C.

For convenience, the amusement devices 10A, 10B, 10C will be referred to hereinafter simply as "amusement device 10," the displays 12A, 12B, 12C will be referred to hereinafter simply as "display 12," and the input components 14A, 14B, 14C will be referred to hereinafter simply as "input component 14."

Turning now to the operation of the amusement device 10, the memory U2 stores one or more application programs, such as electronic games, a music or video jukebox program, or the like, and a system control program. However, the one or more application programs may also be stored remotely. The controller U1 controls the touchscreen display 12 based upon the system control program retrieved from the memory U2 and based upon inputs from the touchscreen display 12. As used herein, the system control program refers to all of the software functions outside of the application program files including an operating system, device profile, display control, input control, sound drivers, and the like. Other input devices which may be connected to the amusement device 10 include a pushbutton(s), a trackball or touchpad, a mouse, a joy-stick, a foot-pedal, a voice recognition system, a keypad or keyboard, and the like. But, preferably, the input device is the touchscreen display 12.

Figure 2:
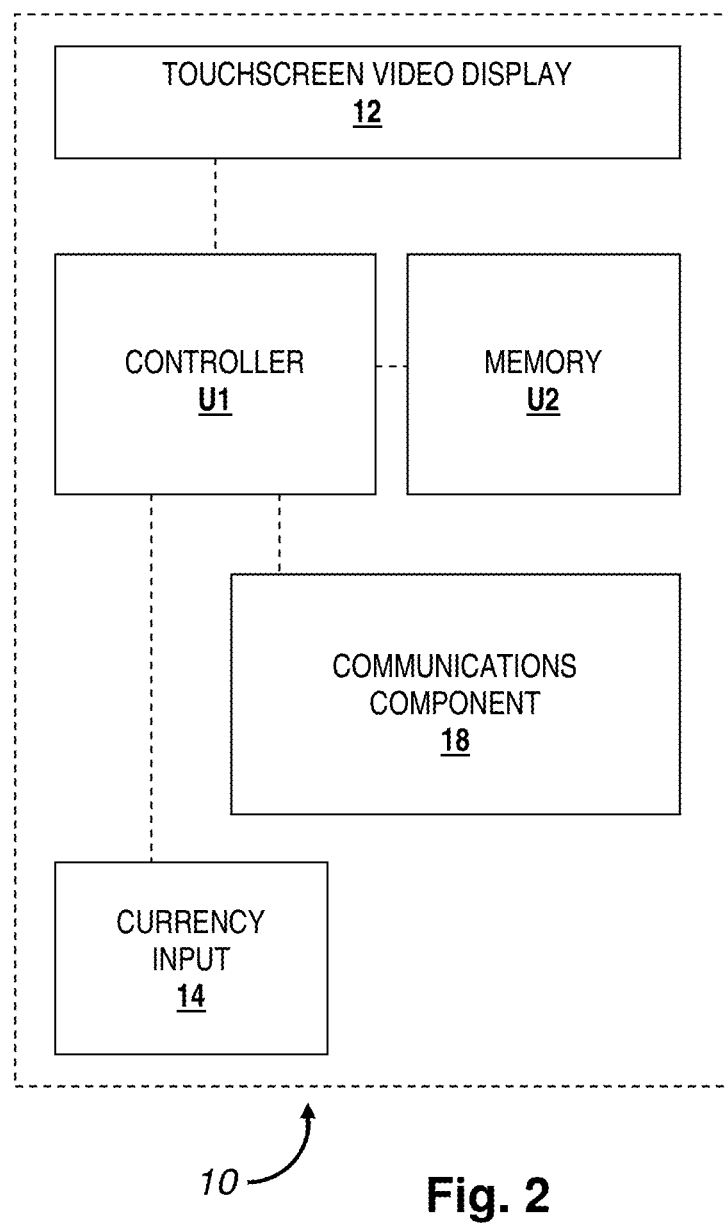
FIG. 2 is a schematic block diagram of an amusement system including a credit card transaction terminal in accordance with preferred embodiments of the present invention.

FIG. 2 is a schematic block diagram of the amusement device 10 described above. The touchscreen display 12 is coupled to the controller U1. Also coupled to the controller U1 is a currency input 14. The currency input 14 may accept at least one of coins (or tokens), currency (e.g. paper money or the like), credit cards/debit cards, and the like. Although only one currency input 14 is shown, the amusement device 10 may include more than one input component 14 to give a user an option for payment, for permitting multiple players, or the like. Preferably, the amusement device 10 is made operable upon payment by a user, which may optionally be received via the currency input 14.

The amusement device 10 also includes a communications component 18, such as an Ethernet port, a wireless transceiver, an infrared (IR) port, or the like. Using the communications component 18, the amusement device 10 may communicate with other devices or file servers, access the Internet, communicate over wide area networks (WANs) or local area networks (LANs), or the like. For example, the amusement device 10 may connect with a second amusement device (not shown) using the communications component 18. The second amusement device optionally includes all of the same components and features as amusement device 10. The communications component 18 is connected to the controller U1 and through the controller U1 to the memory U2. The amusement device 10 includes an operating mode and a setup mode. To switch from the operating mode to the setup mode, when an operator is present at the amusement device 10, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 10. When the operating mode is selected, a player or user is selectively permitted to access the application programs. When the setup mode is selected, the owner/operator is permitted to make system setup adjustments.

Figure 3A:
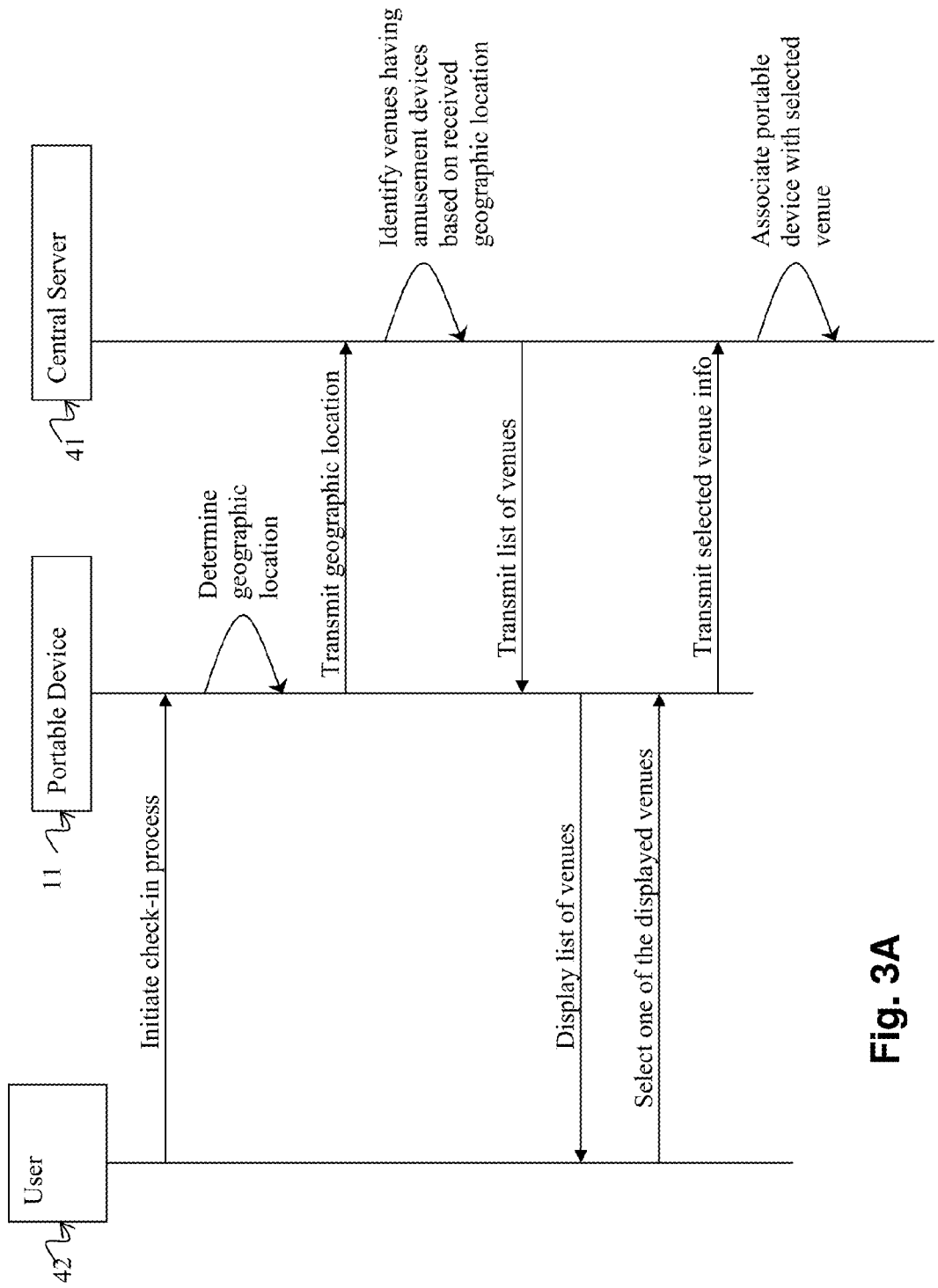
FIG. 3A is a sequence diagram illustrating communications for performing a check-in of a user's portable device at a venue having an amusement device in accordance with preferred embodiments of the present invention.

Users typically interact with the amusement device 10 using the touchscreen display 12 or other input peripherals (keyboard, mouse, buttons, etc). However, certain services of the amusement device 10 may be available to the user without physically interacting with the amusement device 10. In a preferred embodiment, a user remotely interacts with the amusement device 10 over a network. Preferably, the network is the Internet and the user transmits service requests and other messages to the amusement device 10 through a forwarding agent such as a central server, local server, hub, router, switch, or the like. Referring to FIG. 3A, the user communicates with the forwarding agent using a portable device 11 such as a smart phone, tablet computer, personal digital assistant, laptop or the like. The portable device 11 preferably includes a wireless communications interface for communicating using a wide area network protocol such as 3G, WiMAX, 3GPP Long Term Evolution ("LTE"), IEEE 802.11 ("WiFi") and the like.

The portable device 11 is configured to display one or more screens for interacting with the amusement device 10 through the forwarding agent. An application configured to display the one or more screens on the portable device 11 may typically be downloaded from an application store such as the APPLE APP STORE, GOOGLE PLAY, AMAZON APPSTORE or the like. Alternatively, the portable device 11 may communicate with the forwarding agent or the amusement device 10 over the Internet by a user entering an IP address or website address corresponding to a homepage or web application for interacting with the forwarding agent or the amusement device 10. Due to its central nature, the forwarding agent is typically easily located through a static IP address or website address. However, it is more challenging to identify a particular amusement device 10 that the user desires to communicate with. There are typically a large number of similar amusement devices 10 deployed at various geographic locations, each of the deployed amusement devices 10 having unique communication addresses. Thus, in order to interact with a desired amusement device 10, some unique information about the desired amusement device 10, such as its location, serial number or other identifier, must be known. If this information is known to the user, it may be provided to the forwarding agent by the user. Otherwise, the forwarding agent may suggest venues and/or amusement devices 10, as described herein.

Referring to FIG. 3A, a sequence diagram showing communications for checking into a venue having one or more amusement devices 10 is shown. A user 42 initiates the check-in process by activating the application or web-site for the amusement device network on the portable device 11. In response, the portable device 11 determines its geographic location. If the portable device 11 includes a Global Positioning System ("GPS") receiver, the location is preferably determined based on the GPS coordinates. Alternatively, the portable device 11 may determine its geographic location by any other known method for acquiring geographic location information, such as using signal triangulation techniques, or requesting for a current address to be entered by the user 42. Once the portable device 11 has determined its geographic location, it transmits a request for venues having amusement devices 10 near the geographic location to the central server 41.

The central server 41 receives the geographic location information from the portable device 11 and identifies venues having amusement devices 10 near the received geographic location. The central server 41 may use any of a plurality of techniques for identifying venues. Preferably, the central server 41 compiles a list of venues that are located within a predetermined distance of the received geographic location. The predetermined distance may be based on the general location of the portable device 10. For example, in a dense urban area having many venues with amusement devices 10, the predetermined distance may be limited to one (1) mile, while in a rural area, the predetermined distance may be ten (10) miles or more. However, any other techniques for identifying venues near the geographic location of the portable device 11 may be used.

The central server 41 transmits a list of identified venues to the portable device 11. The portable device 11 displays the list of venues to the user 42. An example of a list of venues presented on a portable device 11 is shown with reference to FIG. 3B. The list of venues is preferably presented as an ordered list based on the distance of the venue from the geographic location determined by the portable device 11. The list of venues may alternatively or additionally be presented to the user 42 by displaying a map showing the locations of the venues. The map may be generated using an application programming interface ("API") such as the GOOGLE MAPS API.

Figure 3C:
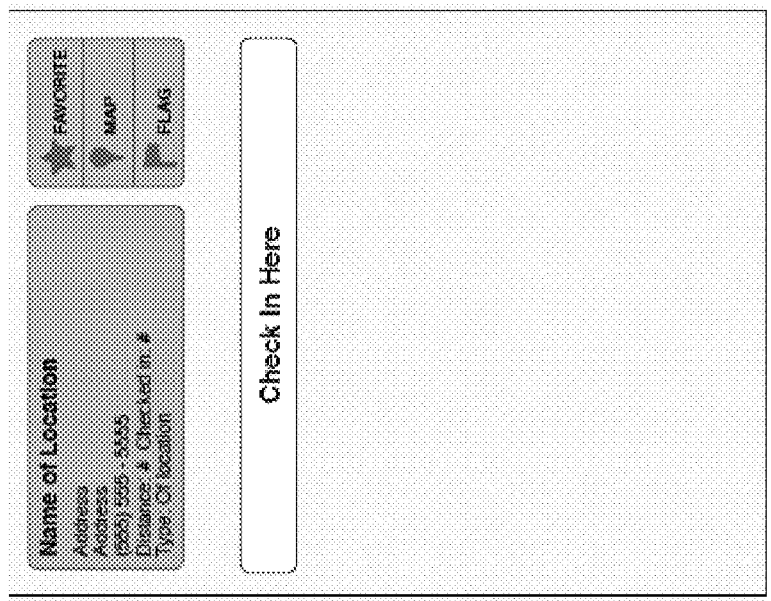
FIG. 3C is an illustration of a venue information list for a selected venue of FIG. 3A.
Figure 3B:
FIG. 3B is an illustration of a venue list displayed by a portable device of FIG. 3A.

The user 42 selects one of the displayed venues from the list of venues (FIG. 3B) by clicking, touching, or tapping on the desired venue choice. In response, the portable device 11 may optionally provide an additional screen showing details for the selected venue, as shown in FIG. 3C. The details may include, for example, the number of other individuals checked in at the location and a map showing the location. The details may optionally include information about the amusement devices 10 believed to be deployed at the venue, such as whether the amusement devices 10 deployed at the location are properly operating, whether the amusement devices 10 are currently being utilized, and, if so, may optionally describe the content being played on the respective amusement devices 10. Additionally, the details may include the content available to be played on the amusement devices 10. For example, where an amusement device 10 includes a music playback service, typically known as a jukebox, the details screen may include a listing of the musical compositions available to be played on the amusement device 10.

Once the desired venue has been selected by the user 42, the user preferably presses a button to check into the selected venue, as shown in FIG. 3C. Returning to FIG. 3A, the portable device 11 transmits the selected venue information to the central server 41. The central server 41 then associates the portable device 11 with the selected venue. While FIG. 3A describes the portable device 11 as being associated with the venue, where the user 42 has a player account for the amusement device network, the central server 41 preferably associates the user's player account with the selected venue.

Figure 4:
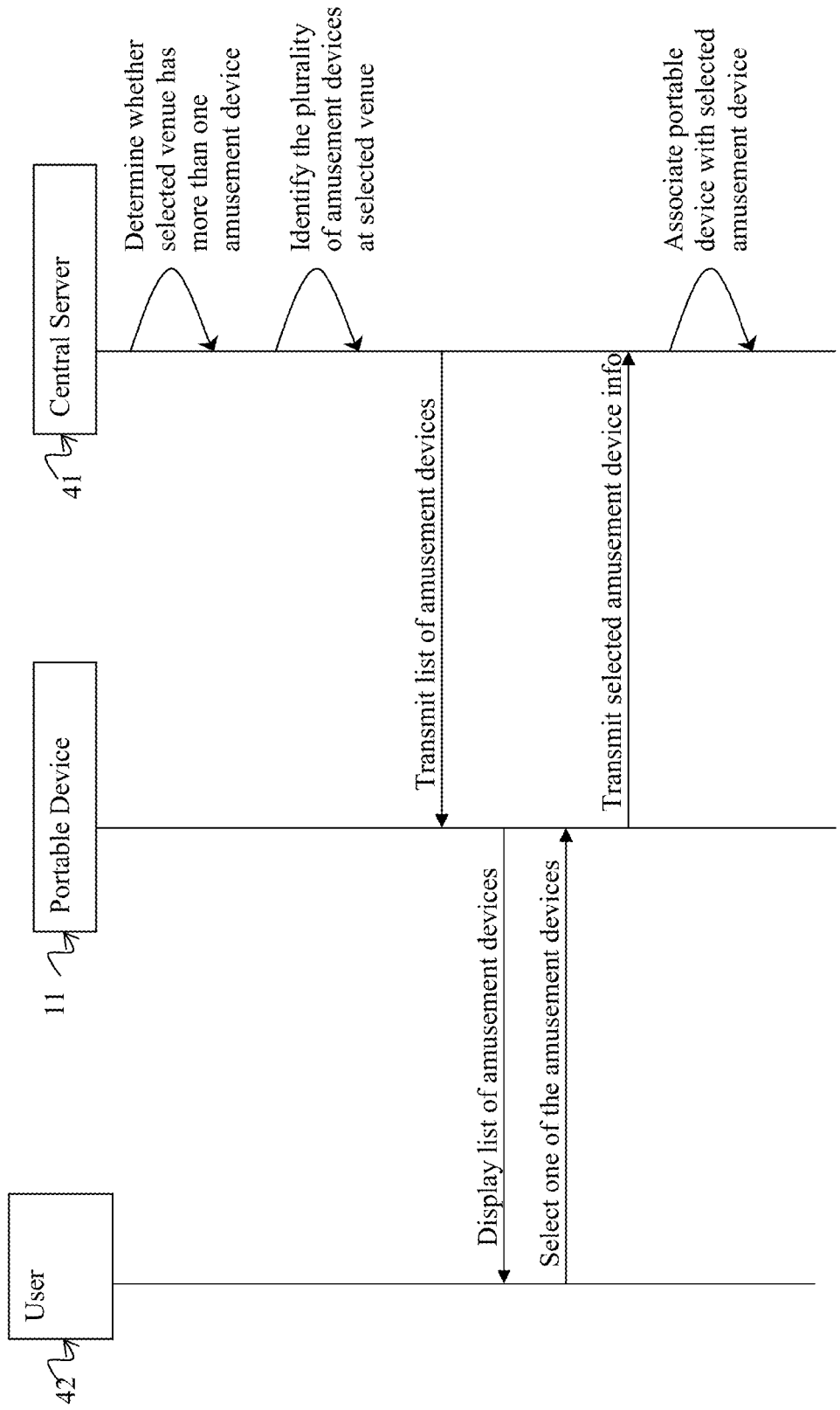
FIG. 4 is a sequence diagram illustrating communications for checking into a specific amusement device at a venue in accordance with preferred embodiments of the present invention.

Referring now to FIG. 4, a sequence diagram illustrating communications for selecting an amusement device 10 in a venue having multiple amusement devices 10 is described. The central server 41 determines whether the selected venue has more than one amusement device 10 and identifies all of the available amusement devices 10 at the selected venue. Where there is a single amusement device 10 deployed at the venue, all interactivity is necessarily performed with the single amusement device 10. However, where there are multiple amusement devices 10, the central server 41 may automatically determine which amusement device 10 the user 42 will interact with based on considerations such as load balancing and the status of the various amusement devices 10. Alternatively, the user 42 may pick one of the amusement devices 10 by interacting with it, such as by selecting unique indicia identifying the amusement device 10. The unique indicia may be a barcode, MAC address, serial number, IP address, or the like. Preferably, the barcode is a two-dimensional barcode such as a QR code.

Returning again to FIG. 4, the list of amusement devices 10 is transmitted to the portable device 11 and is displayed to the user 42. The user 42 optionally reviews the status of each of the amusement devices 10, as described above, and uses the portable device 11 to select one of the amusement devices 10 to interact with. The portable device 11 transmits the selected amusement device information to the central server 41, which associates the selected amusement device 10 with the portable device 11 (or with the player account of user 42). In certain embodiments, a venue may be selected followed by an amusement device 10 within the selected venue, as shown in FIGS. 3A and 4. In other embodiments, an amusement device 10 may be selected without first selecting a venue. Thus, the processes of venue selection and amusement device 10 selection of FIGS. 3A and 4 may be performed independently.

Figure 5A:
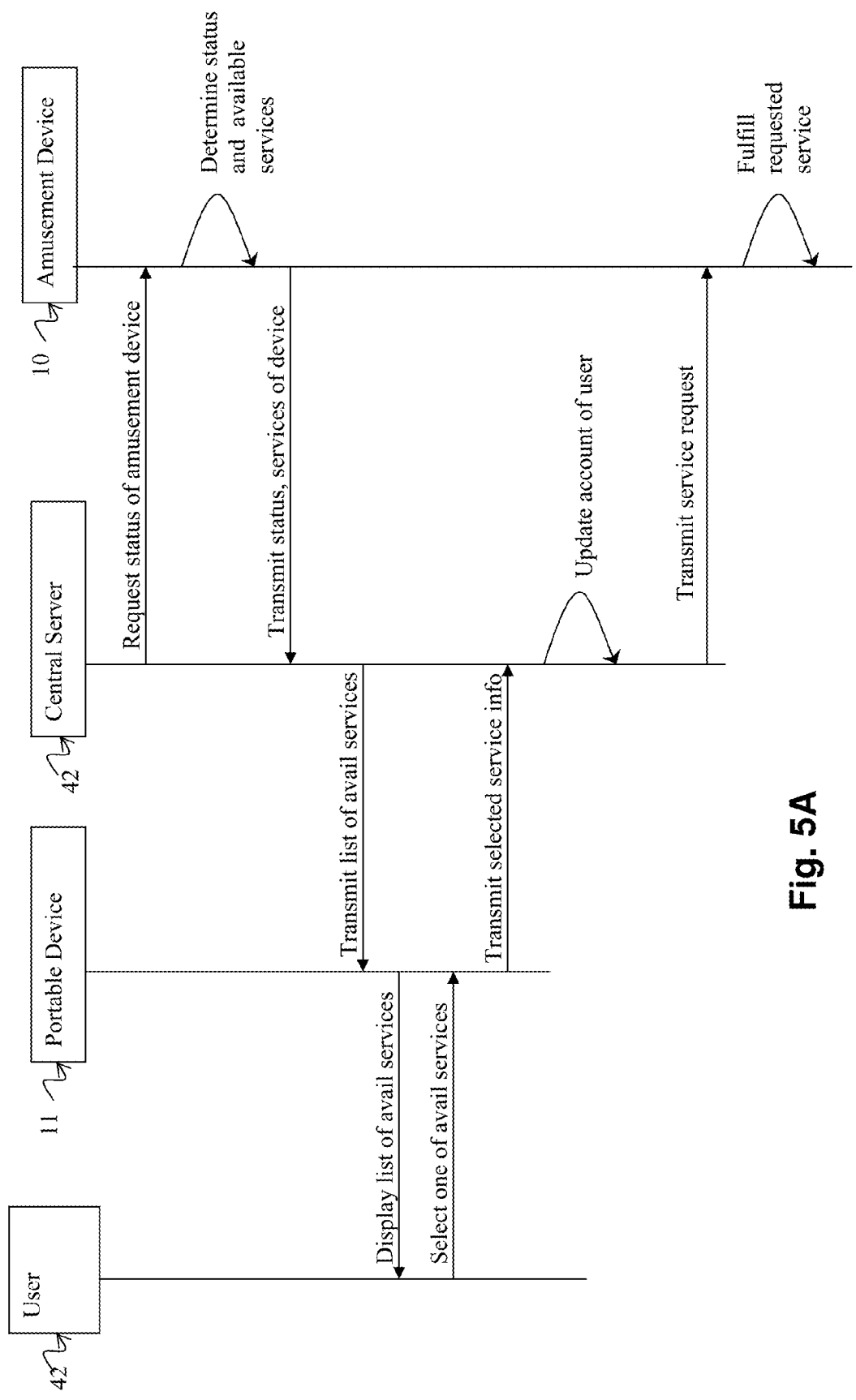
FIG. 5A is a sequence diagram illustrating communications for fulfilling a service request at a selected amusement device in accordance with preferred embodiments of the present invention.
Figure 5B:
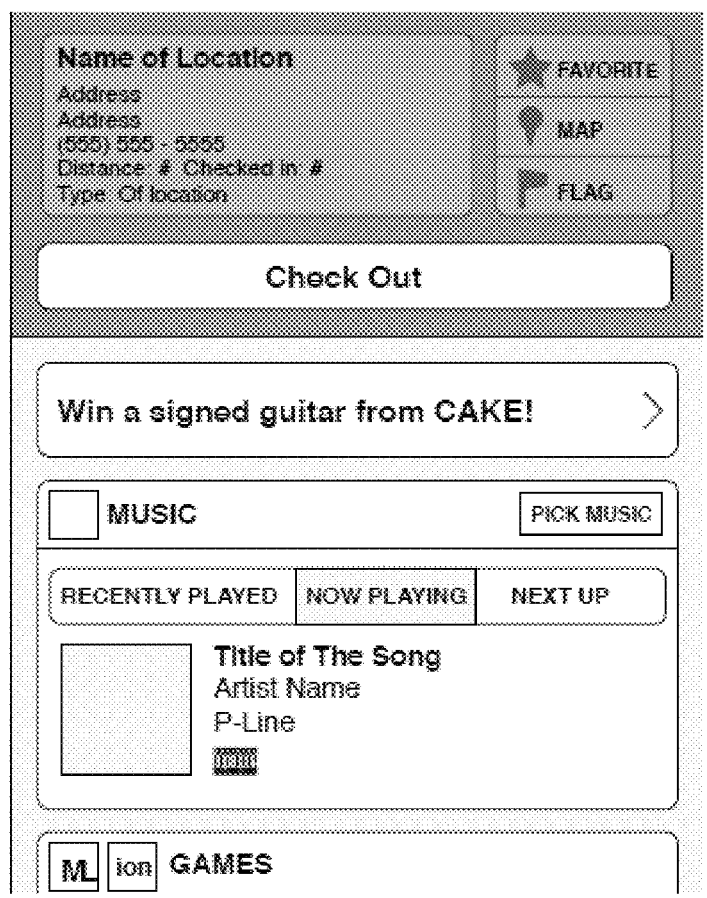
FIG. 5B is an illustration of an example of an available services list for an amusement device of FIG. 5A.

Referring now to FIG. 5A, a sequence diagram illustrating communications for remotely interacting with the selected amusement device 10 is described. The central server 42 requests the status of the amusement device 10. The amusement device 10 checks its current status, determines the services available to remote users and transmits the information to the central server 42. Alternatively, the central server 41 may determine the available services for the amusement device 10 based on the received status information and, optionally, also based on information about the user 42, such as that found in the player account of user 42. The central server 42 then transmits a list of available services, along with status information to the portable device 11 to be displayed to the user 42, as shown in FIG. 5B. The user reviews the available services and selects one or more of the services using the portable device 11. The portable device 11 transmits the selected service information to the central server 42. Upon receiving the selected service information, the central server 42 optionally updates the player account of user 42. The updating may be, for example, debiting or crediting an account balance based on the service desired. The central server 42 then transmits a service request message to the amusement device 10. The communications between the central server 42 and the amusement device 10 may use any protocol, but preferably are performed using a secured connection. Even more preferably, the central server 42 and the amusement device 10 maintain a long-lived HTTP connection that allows for pushing and pulling of data and reduces the need for periodic polling by the amusement device 10 of the central server 42 (or vice versa). The amusement device 10 receives the service request and fulfils it when possible. Where the amusement device 10 is idle, the service may be fulfilled immediately upon receiving the communication from the central server 42. However, in other cases, the service may be queued to be fulfilled at a later time, such as where a song request is added to a playlist of songs requested by other patrons or user 5.

A wide range of services may be available to the user 42 to be remotely fulfilled by the amusement device 10. The range of services depends, in part, on the capabilities of the amusement device 10, the settings of the amusement device 10, the player account of the user 42, the capabilities and settings of the central server 42, and the like. Generally, the available services are determined based on the business judgment of an owner/operator of the venue at which the amusement device 10 has been deployed. Examples of services that may be available remotely include the aforementioned media jukebox, displaying score information for games playable on the amusement device 10, live look-ins into games being played by other patrons or users on the amusement device 10, demos of games available to be played on the amusement device 10, multiplayer mode allowing the user 42 to play games available on the amusement device 10 against competitors using the amusement device 10, and the like.

Operation of the jukebox mode of an amusement device 10 will now be described. The portable device 11 may display a listing of available songs to be played on the selected amusement device 10. The songs are preferably organized by artist, album, or the like and playlists of songs may be available for searching and/or browsing by the user 42. The user 42 may be allowed to create personal playlists of songs for easy access during future interaction with the selected amusement device 10 or other amusement devices 10 within the amusement device network. Additionally, the central server 41 may track the user's 42 favorite songs and make those songs easily accessible to the user 42. When the user 42 selects a song to be played, the user's player account balance is debited for the amount the song costs to play. If the selected amusement device 10 has a queue of songs to be played, the user 42 may be offered the opportunity to move his/her song up in the queue by paying additional credits. There may be tiers of queues with increasing payment levels that allow the user 42 to move the desired song ahead of songs in the lower tier playlists.

Figure 6:
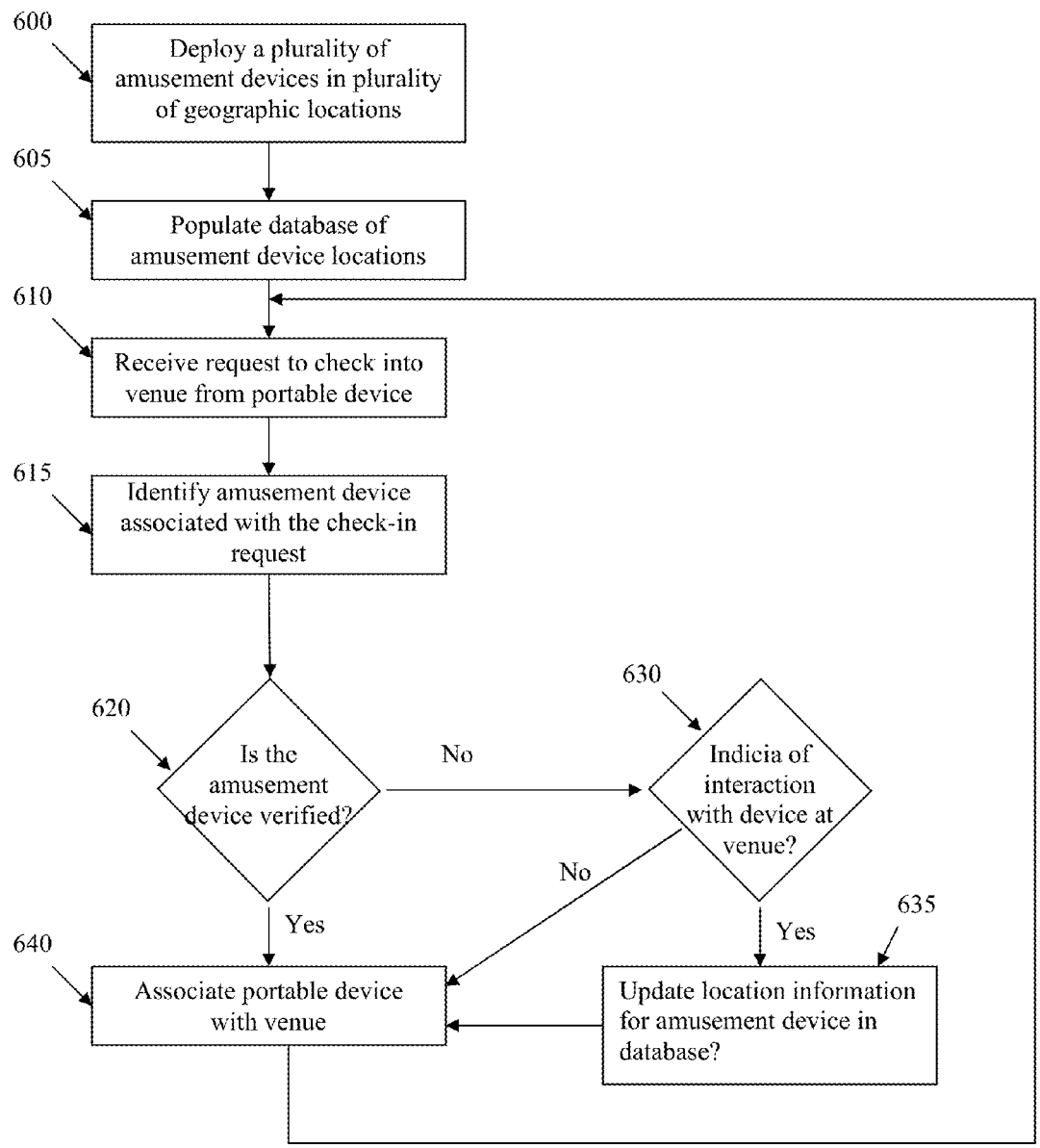
FIG. 6 is a flowchart illustrating steps for updating a database of location information in accordance with preferred embodiments of the present invention.

The interactivity data compiled by the central server 42 from communications with various portable devices 11 may be used to improve the accuracy of the database of venue and amusement device 10 location information. Referring to FIG. 6, a flowchart illustrating steps for updating the database of amusement device 10 location information is described. At step 600, a plurality of amusement devices 10 are deployed at a plurality of venues in a plurality of geographic locations. At step 605, the database of amusement device 10 locations is populated based on the deployments, as well as based on the location information provided by owners and/or operators of the amusement devices 10 and the venue owners/operators at which the amusement devices 10 are deployed. Preferably, the database includes each of the deployed amusement devices 10 with a unique identifier such as a serial number, MAC address, or the like. For each of the venues at which an amusement device 10 is deployed, a venue name and a geographic location is stored. The geographic location may be stored based on, for example, the street address or geographic coordinates of the venue.

At step 610, a request to check into a venue is received from a portable device 11, as described with respect to FIG. 3A. At step 615, the check-in request is analyzed to identify one or more amusement devices 10 associated with the check-in request. Next, at step 620, it is determined whether the amusement device 10 has been verified in a location database of the amusement device 10 network operator. At step 620, if the amusement device 10 is verified, the process proceeds to step 640 and the portable device 11 is associated with the amusement device 10. However, if at step 620 the amusement device 10 has not been verified, the process proceeds to step 630, where it is determined if there is indicia of an interaction with the amusement device 10 at the venue. For example, the user 42 using a portable device 11 to scan a QR code of the amusement device 10 or the user 42 entering a serial number of the amusement device 10 are indicia of interaction with the amusement device 10. When such an interaction is available, at step 635, the database of location information is updated if the venue to which the user 42 is checking in matches the information stored in the database for the venue at which the amusement device 10 is deployed. However, if the information does not match, the database is not updated and the portable device 11 is associated with the venue and the database of location information is not updated at step 640. Once the location information for an amusement device 10 has been verified by receiving the physical interaction information from the portable device 11, the database may store information identifying the amusement device 10 as being a verified location. Preferably, the verification lasts for a predetermined period of time and periodically (or randomly) becomes unverified, again requiring a user 42 to verify the amusement device 10 by interacting with it, as described above. The amusement device 10 may also become unverified when a complaint is logged to the central server 41 from a user 42, such as when the user 42 has requested that the amusement device 10 perform a service that is not fulfilled or specifically that the amusement device 10 is physically not present at the location.

If at step 635 it is determined that a geographic location of the portable device 11 does not match the location information stored for the amusement device 10 in the location database, the location database may be updated with the new location information. Alternatively, the new location information may be stored to be verified by the central server 41, a central authority, amusement device 10 owner/operator or venue owner/operator, or the like at a later time.

In a second embodiment, when geographic location information for the check-in request is available at step 620, the location of the amusement device stored in the database populated in step 605 is compared with the geographic location information received with the check-in request. It is then determined whether the locations match, or if the locations are within a predetermined error bounds of one another. If the locations match, the check-in request is fulfilled and the portable device 11 is associated with the venue.

In the case where it is determined that the locations do not match, the location information for the amusement device 10 may be updated in the database. Preferably, when the locations do not match, it is further determined whether the portable device 11 is located proximate to the amusement device 10. A plurality of techniques for making this determination are available. First, it may be determined whether the user 42 is attempting to request a service of the amusement device 10 that requires the user 42 to be present at the location. One such service is the jukebox music player, as it is unlikely that the user 42 would request a play of a song when he or she is not in the venue where the song would be played.

Second, it may be determined whether the user 42 has recently physically interacted with the requested amusement device 10. This may be done by determining whether the user's 42 player account has been accessed from the requested amusement device 10 within a predetermined amount of time prior to receiving the check-in request. For example, if it is determined that five minutes prior to receiving the check-in request, the user's 42 player account was recorded to be playing a game on the amusement device 10, it is likely that the user 42 is still at the same venue.

Another technique may be to require the user 42 to enter an identifier of the amusement device 10 after determining the user's geographic location. For example, the user 42 may be requested to scan a QR code or enter a serial number of the amusement device 10. To encourage such behavior, a bonus such as a credit or free play may be provided for doing so. When it is determined that the location of the portable device 11 is proximate to the requested amusement device 10, the database is updated in step 635 with the new amusement device 10 location information. The portable device 11 is then associated with the venue at step 640.

In alternative embodiments, where it cannot be definitively determined that the user 42 is at the same location as the amusement device 10, the location information associated with the check-in may be stored without updating the location listed in the database for the amusement device 10. Thereafter, when additional check-in requests associated with the amusement device 10 are received, the central server 42 determines whether the new check-in requests have geographic location matching the geographic location of the first check-in request. The database is then updated when the geographic locations of a predetermined number of check-in requests match or a threshold necessary to update the location stored in the database is reached.

Figure 7:
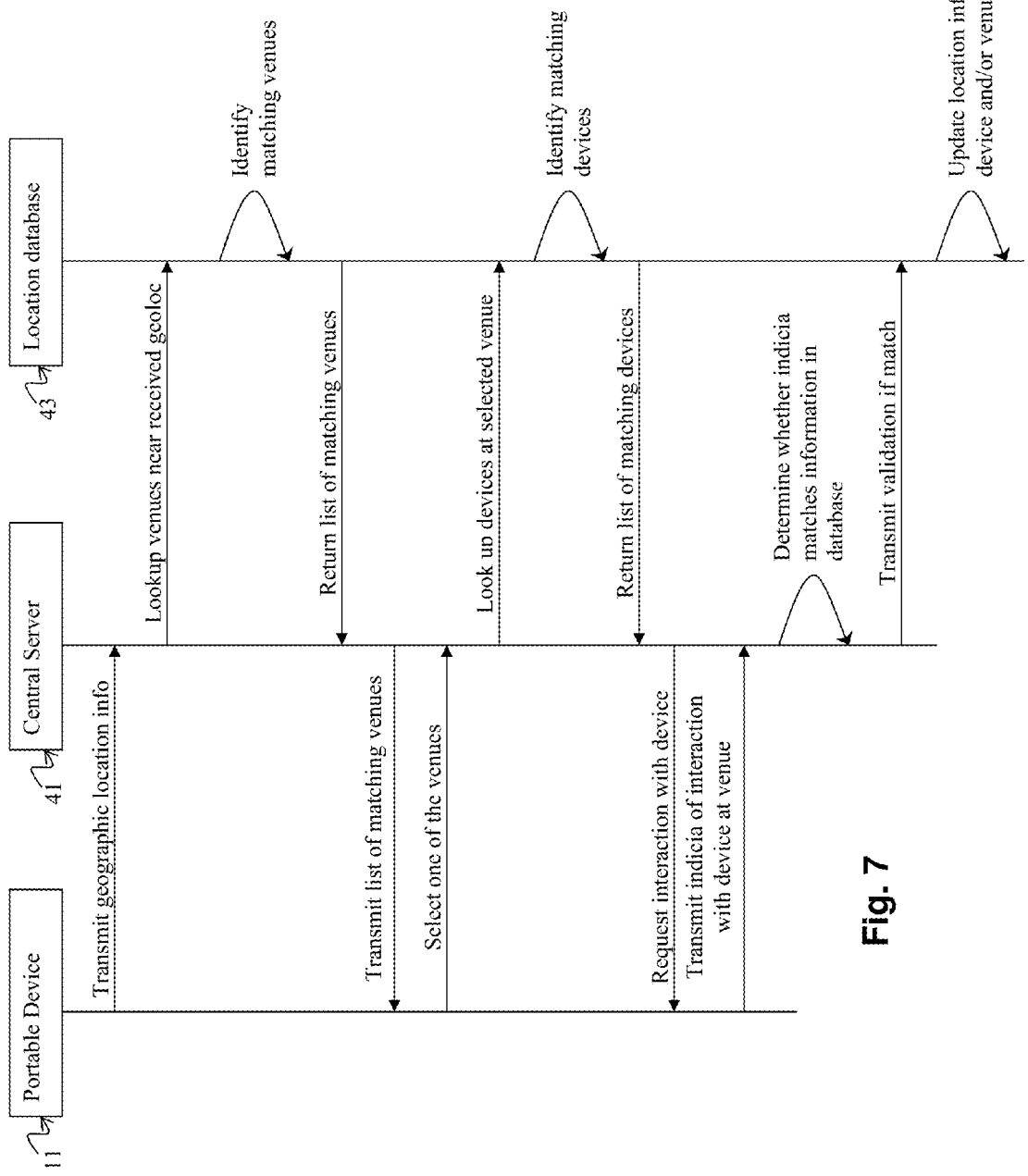
FIG. 7 is a sequence diagram illustrating communications for the database update process of FIG. 6.

Referring now to FIG. 7, a sequence diagram illustrating the communications for updating the database of amusement device 10 location information is described. The portable device 11 transmits geographic location information to the central server 41. The central server 41 looks up venues near the received geographic location in a location database 43. The location database 43 identifies venues near the geographic location of the portable device 11 and returns a list of the matching venues to the central server 41. The list is transmitted to the portable device 11, where a user (not shown) selects one of the venues, as described above with reference to FIG. 3A. The central server 41 receives the selection of the venue from the portable device 11 and, if necessary (e.g., if there are more than one devices at the selected venue), looks up devices at the selected venue. The location database 43 identifies matching devices and returns a list to the central server 41.

The central server 41 then transmits a request to the portable device 11 for an interaction with the amusement device 10 located at the selected venue. The user uses the portable device 11 to perform the requested interaction, such as scanning a QR code associated with the amusement device 10 or entering a serial number of the amusement device 10. The portable device 11 transmits indicia of this interaction to the central server 41. The central server 41 determines whether to verify the amusement device 10 based on the received indicia and transmits a request to update the location database 43 for the selected amusement device 10. The location database 43 stores indicia of the verification of amusement device 10.

In another embodiment, where location information is available, the central server 41 determines the proximity of the portable device 11 to at least one of the matching devices and compares the geographic location information of the portable device 11 to the location information stored for the device and/or the venue stored in the location database 43. The central server 41 then determines whether the geographic location information for the device and/or the venue should be updated in the location database 43, as described with reference to FIG. 6. If the location information needs to be updated in the location database 43, the location information is transmitted to the location database 43 by the central server 41. The location database 43 then updates the location information for the device and/or the venue.

In some cases, a user 42 may visit a venue having an amusement device 10 that is not listed in the location database 43. The user 42 may interact with the amusement device 10 by inputting an indicia of the amusement device 10. The central server 41 may transmit a request to the portable device 11 of the user 42 to enter the venue name of the venue at which the amusement device 10 is deployed or to select the venue name from a list of possible venue names that are located near the user's 42 geographic location. The list of venue names may, for example, be acquired from a points of interest database such as GOOGLE MAPS. The central server 41 may then add the new venue and amusement device 10 location information to the location database 43. Preferably, the venue is added when the portable device 11 has provided current geographic location information for the venue.

FIG. 8A illustrates schematically various embodiments of implementing an amusement system 1000 including one or more amusement devices 10. A gaming location 8 may, for example, house one or more amusement devices 10 that may each be individually in communication with a central server 41. The central server 41 is typically geographically remote from the amusement device 10.

The gaming location 8 may also have a central communication hub 22, enabling the communication between all of the amusement devices 10 housed therein with the central server 41. In this embodiment, the central server 41 may communicate with the central communication hub 22 to perform load balancing of requests from multiple portable devices 11 such that no single amusement device 10 is overburdened with the remote interaction requests. In another alternative arrangement, as shown in FIG. 8B, the gaming location 8 may house its own local server 23, which performs all of the functions listed above with respect to the central server 41 and/or the computing device 11 for all of the local amusement devices 10. The local server 23 may be housed in gaming location 8 and need not be remote to every amusement device 10.

The amusement devices 10 may be connected to their corresponding servers 41, 23 through conventional communication configurations, such as a LAN, WAN, or the like. In one preferred embodiment, an amusement device 10 may connect to the central server 41 via the Internet. It is thus understood by those skilled in the art that the amusement system 1000 is not limited to the arrangements described above, and may include any configuration wherein a user account for obtaining playable credits is maintained.

The amusement device 10 may also include other functionality and features such as music jukebox, video jukebox, multimedia player, Internet browsing, broadcast media viewing, time based rental mode, non-prize tournaments, prize-based tournaments, head-to-head competitions, prize-based lotteries, ticket dispensing, prize dispensing, debit/credit card charging, phone card dispensing, e-mail, photography, placing customer orders, communicating with other amusement devices 10, and the like.

The amusement device 10 may also provide for remote or local access for accounting and/or bookkeeping purposes. The amusement device 10 may include a local connector for uploading to a hand-held or portable computer or removable memory for receiving accounting or other data. The amusement device 10 may include accounting and bookkeeping screens accessible by an operator through set up screens and/or through password protection.

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present invention as defined by the appended claims.

What is claimed is:

1. A method of improving accuracy of a database of amusement device locations, the method comprising:
   a) deploying a plurality of amusement devices at a plurality of locations;
   b) populating the database of amusement device locations based on the deploying of step (a);
   c) receiving, by a server over a network, from a portable device, a check-in request, the check-in request associated with one of the amusement devices, and including geographic location information associated with the portable device at the time the check-in request is made;
   d) comparing, by the server, the geographic location information received from the portable device with the location of the amusement device stored in the database;
   e) transmitting, by the server, to the portable device a request to enter an indicia of an interaction with the amusement device, wherein the indicia comprises an identifier unique to the amusement device; and
   f) updating, by the server, the database based, at least in part, on the comparing of step (d).

2. The method of claim 1, further comprising determining whether the location of the amusement device associated with the check-in has been verified in the database prior to the comparing of step (d).

3. The method of claim 2, wherein in the case that the location of the amusement device has not been verified, the method further comprises determining that indicia of an interaction with the amusement device has been received from the portable device, and thereafter performing step (e).

4. The method of claim 3, wherein the indicia of the interaction is a scan by the portable device of a barcode on the amusement device.

5. The method of claim 4, wherein the barcode encodes the unique identifier associated with the amusement device.

6. The method of claim 3, wherein the indicia of the interaction is entry of the unique identifier associated with the amusement device by a user associated with the portable device.

7. The method of claim 2, further comprising periodically unverifying verified amusement devices in the database.

8. The method of claim 2, wherein the updating step (e) further comprises determining by the server that the geographic location information received with the first check-in request does not match the location information stored in the database for the amusement device, and storing the received geographic location information in the database.

9. A method of improving accuracy of a database of amusement device locations, the method comprising:
   a) deploying a plurality of amusement devices at a plurality of locations, each of the plurality of amusement devices associated with a unique identifier that is accessible to venue patrons;
   b) populating the database of amusement device locations with the plurality of locations at which the plurality of amusement devices have been deployed in step (a);
   c) receiving, by a server over a network, interaction data from a portable device associated with one of the venue patrons, the received interaction data including (i) indicia of an interaction comprising a unique identifier associated with an amusement device, and (ii) geographic location information associated with the portable device at the time of the interaction; and d) updating, by the server, the database of amusement device locations based on the indicia of interaction and the received geographic location information.

10. The method of claim 9, wherein the unique identifier is encoded in a barcode on the amusement device.

11. The method of claim 10, wherein the barcode is a QR code.

12. The method of claim 11, wherein the indicia of interaction is generated by a camera of the portable device scanning the QR code to decode the unique identifier.

13. The method of claim 9, wherein the updating of step (d) further comprises determining that the location of the amusement device has not been verified within a predetermined period of time.

14. The method of claim 13, wherein the updating of step (d) further comprises comparing location information associated with the amusement device stored in the database of amusement device locations with the received geographic location information.

15. The method of claim 14, further comprising:
e) marking the location of the amusement device as being verified in response to the updating of step (d).

16. The method of claim 9, wherein the indicia of interaction is generated by a user entering the unique identifier associated with the amusement device into the portable device.

17. The method of claim 9, wherein the plurality of amusement devices are deployed at a plurality of distinct venues, and the database of amusement device locations stores names of the venues associated with the plurality of locations at which the amusement devices have been deployed.

18. A method of updating a database of amusement device locations, the method comprising:
a) deploying a plurality of amusement devices at a plurality of distinct venues;
b) populating the database of amusement device locations with the plurality of venues at which the plurality of amusement devices have been deployed;
c) receiving, by a server over a network, indicia of an interaction with a first amusement device from a portable device, wherein the indicia comprises an identifier unique to the first amusement device;
d) determining, by the server, that the first amusement device is not associated with the correct venue name in the database of amusement device locations;
e) transmitting, by the server, a request to the portable device to select a venue name from a list of venue names of the venue at which the first amusement device is deployed; and
f) updating, by the server, the database of amusement device locations with the provided venue name.

19. The method of claim 13, further comprising:
g) receiving, by the server, a geographic location of the portable device at the time of the interaction with the amusement device, and
h) updating, by the server, the database of amusement device locations with the received geographic location of the amusement device.

* * * * *